(12) United States Patent
Lue et al.

(10) Patent No.: US 9,383,502 B2
(45) Date of Patent: Jul. 5, 2016

(54) BACKLIGHT MODULE

(71) Applicants: Yao-Cheng Lue, Hsin-Chu (TW);
Yi-Chun Tseng, Hsin-Chu (TW);
Bing-Han Tsai, Hsin-Chu (TW)

(72) Inventors: Yao-Cheng Lue, Hsin-Chu (TW);
Yi-Chun Tseng, Hsin-Chu (TW);
Bing-Han Tsai, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 14/700,144

(22) Filed: Apr. 30, 2015

(65) Prior Publication Data
US 2015/0378084 A1 Dec. 31, 2015

(30) Foreign Application Priority Data
Jun. 27, 2014 (TW) .............................. 103122319 A

(51) Int. Cl.
*F21V 8/00* (2006.01)

(52) U.S. Cl.
CPC ............ *G02B 6/0043* (2013.01); *G02B 6/0053* (2013.01); *G02B 6/0055* (2013.01); *G02B 6/0088* (2013.01)

(58) Field of Classification Search
CPC .. G02B 6/0003; G02B 6/0011; G02B 6/0016;
G02B 6/0021; G02B 6/0026; G02B 6/0031;
G02B 6/0035; G02B 6/0051; G02B 6/0053;
G02B 6/0055; G02B 6/0073; G02B 6/0088
USPC ............... 362/230, 231, 249.01, 249.02, 606, 362/607, 612, 613, 615, 617, 618, 621, 622, 362/623, 624, 632, 633, 634
See application file for complete search history.

(56) References Cited

U.S. PATENT DOCUMENTS

| | | | | |
|---|---|---|---|---|
| 8,016,467 | B2 * | 9/2011 | Eberwein | ................ B60R 13/10 362/497 |
| 2008/0084706 | A1 | 4/2008 | Roshan et al. | |
| 2010/0195351 | A1 * | 8/2010 | Ueyama | ............... G02B 6/0068 362/613 |
| 2012/0147622 | A1 * | 6/2012 | Tsai | ..................... G02B 6/0088 362/606 |
| 2013/0335677 | A1 | 12/2013 | You | |
| 2014/0192293 | A1 * | 7/2014 | Kagabu | ................ G02B 6/0055 349/65 |

FOREIGN PATENT DOCUMENTS

| | | |
|---|---|---|
| TW | 200538807 | 12/2005 |
| TW | 201307960 | 2/2013 |
| TW | 201329548 | 7/2013 |

OTHER PUBLICATIONS

"Office Action of Taiwan Counterpart Application," issued on Nov. 2, 2015, p. 1-p. 6, in which the listed references were cited.

* cited by examiner

*Primary Examiner* — Hargobind S Sawhney
(74) *Attorney, Agent, or Firm* — Jianq Chyun IP Office

(57) ABSTRACT

A backlight module including a light guide plate, a light conversion layer, a light source, and a reflecting surface is provided. The light guide plate has a light emitting surface, a back surface, a first side, and a second side. The light emitting surface is opposite to the back surface, and the first side and the second side are connected between the light emitting surface and the back surface. The light conversion layer is disposed on the light emitting surface. The light source is disposed at the first side. The reflecting surface is located at the second side. An included angle between the reflecting surface and an extending direction of the light emitting surface is an acute angle. A light beam emitted by the light source enters the light guide plate through the first side, and is reflected by the reflecting surface after being transmitted through the light guide plate.

9 Claims, 3 Drawing Sheets

BACKLIGHT MODULE

CROSS-REFERENCE TO RELATED APPLICATION

This application claims the priority benefit of Taiwan application serial no. 103122319, filed on Jun. 27, 2014. The entirety of the above-mentioned patent application is hereby incorporated by reference herein and made a part of this specification.

BACKGROUND

1. Technical Field

The invention relates to an optical module, and particularly relates to a backlight module.

2. Related Art

Quantum dots are extremely tiny semiconductor nanocrystalline that cannot be viewed by human eyes. A characteristic thereof is that when the quantum dots are irradiated by light, the quantum dots emit color light, and the color of the light is determined by a composition material and a size and shape of the quantum dots, and such characteristic results in a fact that the quantum dots can change the color of the light emitted by the light source. In recent years, quantum dot polymer composite materials are widely used in domains of backlight and illumination, etc.

Taking quantum dot enhanced film (QDEF) researched and developed by Nanosys company and 3M company as an example, the QDEF is applied to a backlight module of a display apparatus, such that image frames displayed by the display apparatus may have wide color gamut and high color saturation. The QDEF is disposed at a light emitting surface of a light guide plate for converting most of blue light emitted by a blue light emitting diode (LED) light source into red light and green light, such that the blue light, the red light and the green light are mixed into white light. However, according to such light emitting manner, an edge region of a display surface of the display apparatus may have a blue halo phenomenon, which influences the quality of the displayed image, and the blue light leaked from the edge region of the display surface probably causes macular degeneration of user's eyes.

Taiwan patent publication No. 201307960A1 discloses a backlight module, in which an optical film extends to an edge of a light emitting surface of a light guide plate, and is coated with a thin film for shielding light, so as to shield leakage light. Taiwan patent publication No. 201329548A1 discloses a backlight unit, in which an optical film is disposed on a light emitting surface of a light guide plate, and a light conversion and light blocking plate is disposed corresponding to an outer periphery of the optical film, so as to block and reflect the blue light leaked to the outer periphery of the optical film, and meanwhile convert the blue light into white light. U.S. patent publication No. 20130335677A1 discloses a display apparatus, in which a color separation membrane is disposed on a QDEF for retrieving the blue light emitted by a blue LED.

The information disclosed in this BACKGROUND section is only for enhancement of understanding of the BACKGROUND of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The invention is directed to a backlight module, which avoids a blue halo phenomenon occurred at an edge region of a display surface of a display apparatus.

Other objects and advantages of the invention can be further illustrated by the technical features broadly embodied and described as follows.

In order to achieve one or a portion of or all of the objects or other objects, an embodiment of the invention provides a backlight module including a light guide plate, a light conversion layer, a light source, and a reflecting surface. The light guide plate has a light emitting surface, a back surface, a first side, and a second side. The light emitting surface is opposite to the back surface, and the first side and the second side are connected between the light emitting surface and the back surface. The light conversion layer is disposed on the light emitting surface. The light source is disposed at the first side. The reflecting surface is located at the second side. An included angle between the reflecting surface and an extending direction of the light emitting surface is an acute angle. A light beam emitted by the light source enters the light guide plate through the first side, and is reflected by the reflecting surface after being transmitted through the light guide plate.

In an embodiment of the invention, the backlight module further includes a back plate. The light guide plate and the light source are disposed on the back plate, the back plate has a retaining wall, the retaining wall has a plane, and the reflecting surface is the plane.

In an embodiment of the invention, the backlight module further includes a back plate and a reflecting layer. The light guide plate and the light source are disposed on the back plate. The reflecting layer is disposed between the back surface of the light guide plate and the back plate and has an extending portion. The extending portion extends out from the second side of the light guide plate. The extending portion has a plane, and the reflecting surface is the plane.

In an embodiment of the invention, the second side has a plane. An included angle between the plane and the light emitting surface is an acute angle, and the reflecting surface is the plane.

In an embodiment of the invention, the light source is a blue light source, and the light conversion layer is a quantum dot enhanced film (QDEF).

In an embodiment of the invention, the light beam is reflected by the reflecting surface and is transmitted to the light conversion layer.

In an embodiment of the invention, the backlight module further includes a yellow film. The light source is a blue light source, the yellow film is disposed between the reflecting surface and the second side, and the light beam reflected by the reflecting surface is transmitted to the yellow film.

In an embodiment of the invention, the light conversion layer has an extending portion, the extending portion extends out of the light guide plate from the second side, and the yellow film is disposed at the extending portion.

In an embodiment of the invention, the included angle between the reflecting surface and the light emitting surface is between 45 degrees and 60 degrees.

According to the above description, the embodiments of the invention have at least one of the following advantages, an acute angle is formed between the reflecting surface located at the second side of the light guide plate and an extending direction of the light emitting surface, such that after the light beam emitted by the light source enters the light guide plate through the first side and is transmitted through the light guide plate, the light beam is reflected by the reflecting surface to depart from the light guide plate. In this way, the unexpected halo phenomenon occurred at the edge region of the display surface of the display apparatus is prevented, so as to improve the display quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
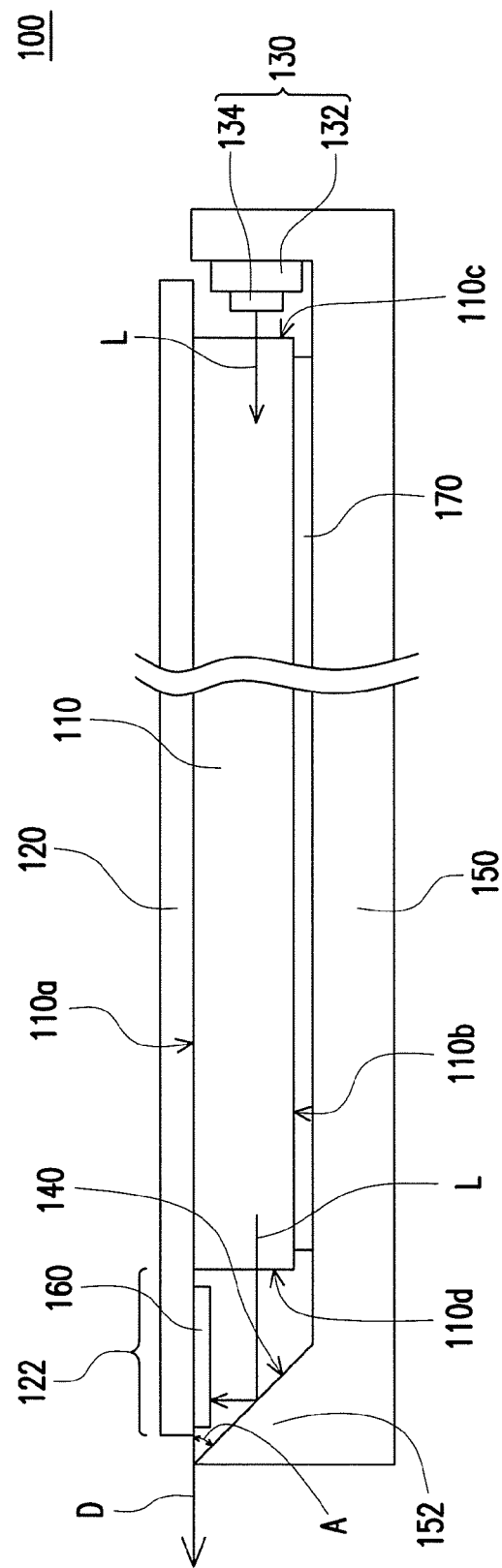
FIG. 1 is a schematic diagram of a backlight module according to an embodiment of the invention.

Referring to FIG. 1, the backlight module 100 of the embodiment includes a light guide plate 110, a light conversion layer 120, a light source 130, a reflecting surface 140, a back plate 150, and a reflecting layer 170. The light guide plate 110 is disposed on the back plate 150 and has a light emitting surface 110a, a back surface 110b, a first side 110c, and a second side 110d. The light emitting surface 110 is opposite to the back surface 110b, the first side is connected between the light emitting surface 110a and the back surface 110b, and the second side 110d is connected between the light emitting surface 110a and the back surface 110b. The light conversion layer 120 is, for example, a quantum dot enhanced film (QDEF), and is disposed on the light emitting surface 110a of the light guide plate 110. The reflecting layer 170 is disposed between the back surface 110b of the light guide plate 110 and the back plate 150.

The light source 130 is disposed on the back plate 150 and is located at the first side 110c of the light guide plate 110. The light source 130 is, for example, a blue light source, and includes a substrate 132 and a blue light emitting diode (LED) element 134 disposed on the substrate 132. A blue light beam emitted by the light source 130 enters the light guide plate 110 and then is transmitted in the light guide plate 110 through the reflecting layer 170 and total reflection of the light guide plate 110, and afterwards reaches the light conversion layer 120 through the light emitting surface 110a and then is partially converted into a red light and a green light by the light conversion layer 120, such that the blue light, the red light, and the green light are mixed into a white light for emitting out.

The reflecting surface 140 is located at the second side 110d of the light guide plate 110. An acute angle A is formed between the reflecting surface 140 and an extending direction D of the light emitting surface 110a, such that the blue light beam L is reflected by the reflecting surface 140 to be transmitted to the light conversion layer 120 to depart from the light guide plate 110 after the blue light beam L emitted by the light source 130 enters the light guide plate 110 from the first side 110c and is transmitted through the light guide plate 110. In this way, when the backlight module 100 of the embodiment is applied to a display apparatus, an unexpected blue halo phenomenon occurred at an edge region of a display surface of the display apparatus is avoided, so as to improve a display quality to avoid degeneration/lesion/disease/illness of user's eyes caused by the blue halo. It the embodiment, since the reflecting surface 140 is configured to prevent generation of the blue halo rather than a situation that a retaining wall 152 is designed to be located away from the second side 110d of the light guide plate 110 to prevent generation of the blue halo, a border width of the display apparatus is not increased due to that the retaining wall 152 is located away from the second side 110d of the light guide plate 110, which avails a slim border design of the display apparatus.

In the embodiment, the included angle A between the reflecting surface 140 and the light emitting surface 110a of the light guide plate 110 ranges from 45 degrees to 60 degrees. However, the invention is not limited thereto, and in other embodiments, the included angle A may be changed to other suitable angles according to an actual design requirement.

In detail, the back plate 150 of the embodiment has the retaining wall 152 located adjacent to the second side 110d of the light guide plate 110, and the reflecting surface 140 is a plane on the retaining wall 152 and is located at the second side 110d. Moreover, the backlight module 100 further includes a yellow film 160, and the light conversion layer 120 has an extending portion 122. The extending portion 122 extends out of the light guide plate 110 from the second side 110*d* of the light guide plate 110, and the yellow film 160 is disposed at the extending portion 122 and is located between the reflecting surface 140 and the second side 110*d*. The blue light beam L reflected by the reflecting surface 140 is transmitted to the yellow film 160. The yellow film 160 mixes the blue light beam L into the white light to further ameliorate/improve the blue halo phenomenon occurred at the edge region of the display surface of the display apparatus. In the backlight module of other embodiments, the yellow film 160 may be omitted, which is not limited by the invention.

Figure 2:
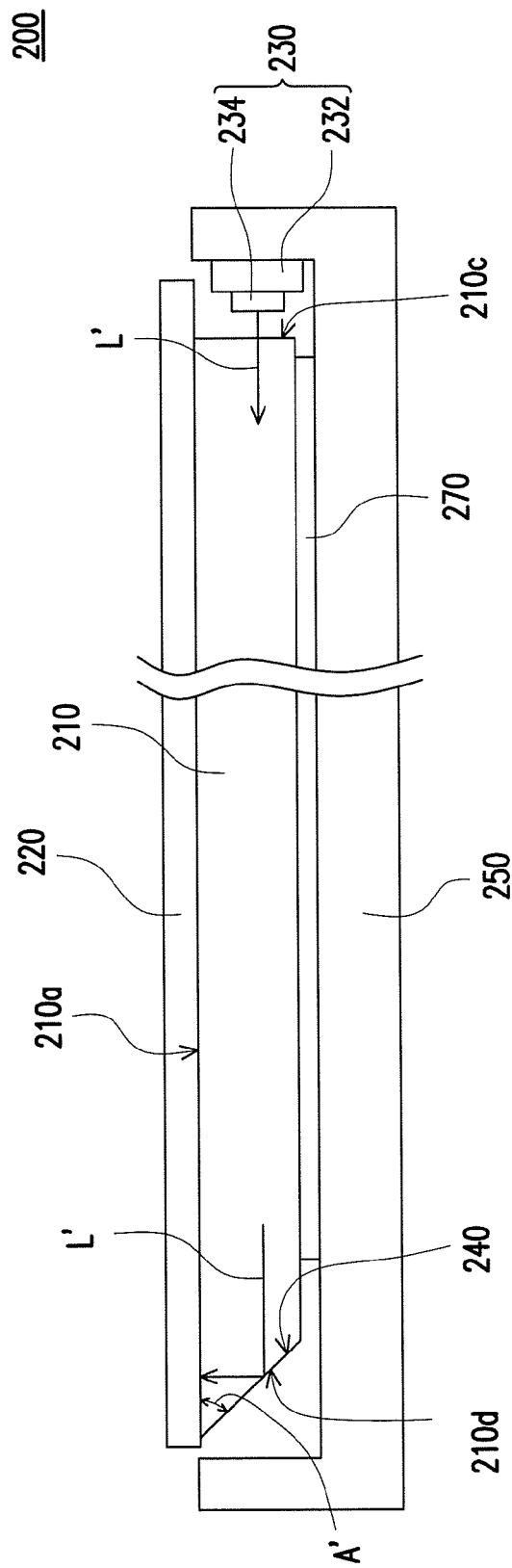
FIG. 2 is a schematic diagram of a backlight module according to another embodiment of the invention.

Referring to FIG. 2, in the backlight module 200 of FIG. 2, configuration and functions of a light guide plate 210, a light conversion layer 220, a light source 230, a substrate 232, a blue LED 234, a back plate 250, and a reflecting layer 270 are similar to configuration and functions of the light guide plate 110, the light conversion layer 120, the light source 130, the substrate 132, the blue LED 134, the back plate 150, and the reflecting layer 170 of FIG. 1, and details thereof are not repeated. A major difference between the backlight module 200 and the backlight module 100 is a configuration method of the reflecting surface. In detail, the reflecting surface 240 of the backlight module 200 is a plane of the second side 210*d* of the light guide plate 210, and an acute angle A' is formed between the plane and the light emitting surface 210*a* of the light guide plate 210; such that after the blue light beam L' emitted by the light source 230 enters the light guide plate 210 from the first side 210*c* and is transmitted through the light guide plate 210, the blue light beam L' is reflected by the reflecting surface 240 to leave/depart from the light guide plate 210.

Figure 3:
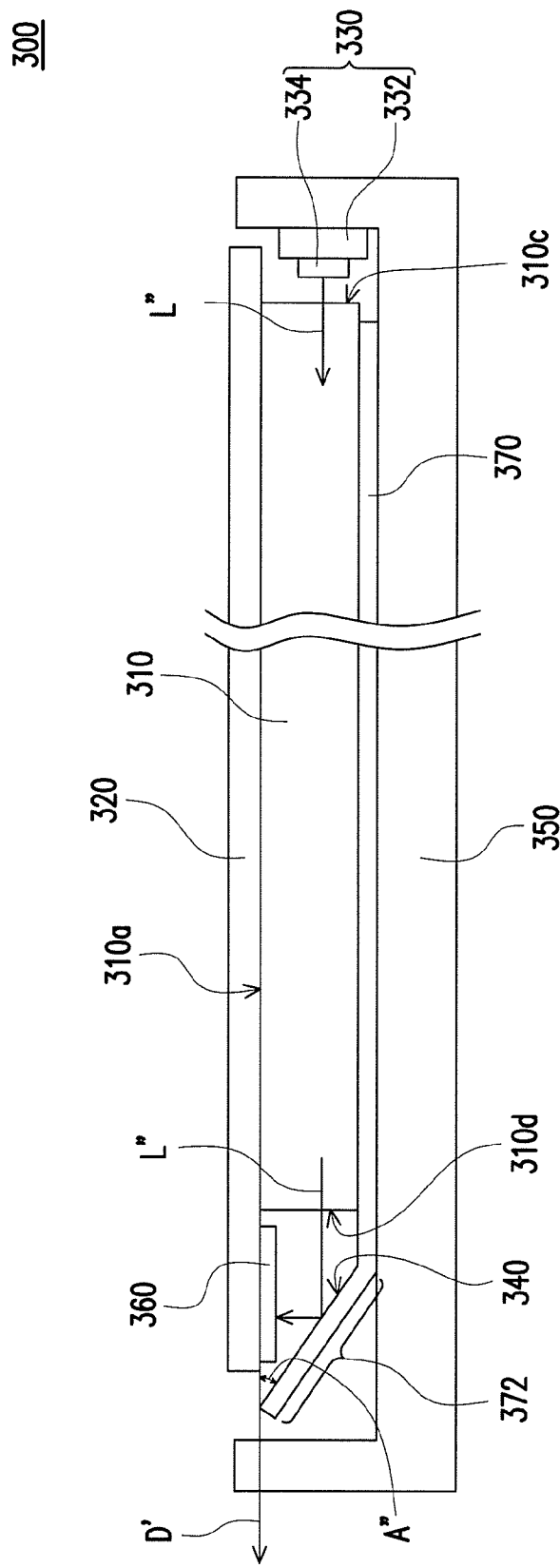
FIG. 3 is a schematic diagram of a backlight module according to still another embodiment of the invention.

Referring to FIG. 3, in the backlight module 300 of FIG. 3, configuration and functions of a light guide plate 310, a light conversion layer 320, a light source 330, a substrate 332, a blue LED 334, a back plate 350, and a yellow film 360 are similar to configuration and functions of the light guide plate 110, the light conversion layer 120, the light source 130, the substrate 132, the blue LED 134, the back plate 150, and the yellow film 160 of FIG. 1, and details thereof are not repeated. A major difference between the backlight module 300 and the backlight module 100 is a configuration method of the reflecting surface. In detail, the reflecting layer 370 of the backlight module 300 has an extending portion 372, the extending portion 372 extends out of the second side 310*d* of the light guide plate 310, and the reflecting surface 340 of the backlight module 300 is a plane of the extending portion 372. An acute angel A' is formed between the plane and an extending direction D' of the light emitting surface 310*a* of the light guide plate 310, such that after the blue light beam L' emitted by the light source 330 enters the light guide plate 310 from the first side 310*c* and is transmitted through the light guide plate 310, the blue light beam L' is reflected by the reflecting surface 340 to leave/depart from the light guide plate 310.

Besides forming the reflecting surface 140 of the backlight module 100 on the retaining wall 152 of the back plate 150 as shown in FIG. 1, or forming the reflecting surface 240 of the backlight module 200 at the second side 210*d* of the light guide plate 210 as shown in FIG. 2, or forming the reflecting surface 340 of the backlight module 300 at the extending portion 372 of the reflecting layer 370 as shown in FIG. 3, in other embodiments, the reflecting surface of the backlight module may be configured according to other suitable manners to form an acute angle between the reflecting surface and an extending direction of the light emitting surface of the light guide plate, which is not limited by the invention.

In summary, the embodiments of the invention have at least one of the following advantages, an acute angle is formed between the reflecting surface located at the second side of the light guide plate and an extending direction of the light emitting surface, such that after the light beam emitted by the light source enters the light guide plate through the first side and is transmitted through the light guide plate, the light beam is reflected by the reflecting surface to depart from the light guide plate. In this way, the unexpected halo phenomenon occurred at the edge region of the display surface of the display apparatus is prevented, so as to improve the display quality. Moreover, under the situation that the light beam emitted by the light source is the blue light beam, a yellow film may be configured between the reflecting surface and the second side of the light guide plate, such that the blue light beam reflected by the reflecting surface is transmitted to the yellow film, and the yellow film mixes the blue light beam into the white light, so as to further mitigate/improve the blue halo phenomenon occurred at the edge region of the display surface of the display apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
    a light guide plate, having a light emitting surface, a back surface, a first side, and a second side, wherein the light emitting surface is opposite to the back surface, the first side is connected between the light emitting surface and the back surface, and the second side is connected between the light emitting surface and the back surface;

a light conversion layer, disposed on the light emitting surface;

a light source, disposed at the first side; and a reflecting surface, located at the second side, wherein an included angle between the reflecting surface and an extending direction of the light emitting surface is an acute angle, a light beam emitted by the light source enters the light guide plate through the first side, and is reflected by the reflecting surface after being transmitted through the light guide plate.

2. The backlight module as claimed in claim 1, further comprising a back plate, wherein the light guide plate and the light source are disposed on the back plate, the back plate has a retaining wall, the retaining wall has a plane, and the reflecting surface is the plane.

3. The backlight module as claimed in claim 1, further comprising a back plate and a reflecting layer, wherein the light guide plate and the light source are disposed on the back plate, the reflecting layer is disposed between the back surface of the light guide plate and the back plate and has an extending portion, the extending portion extends out from the second side of the light guide plate, the extending portion has a plane, and the reflecting surface is the plane.

4. The backlight module as claimed in claim 1, wherein the second side has a plane, an included angle between the plane and the light emitting surface is an acute angle, and the reflecting surface is the plane.

5. The backlight module as claimed in claim 1, wherein the light source is a blue light source, and the light conversion layer is a quantum dot enhanced film.

6. The backlight module as claimed in claim 1, wherein the light beam is reflected by the reflecting surface and is transmitted to the light conversion layer.

7. The backlight module as claimed in claim 1, further comprising a yellow film, wherein the light source is a blue light source, the yellow film is disposed between the reflecting surface and the second side, and the light beam reflected by the reflecting surface is transmitted to the yellow film.

8. The backlight module as claimed in claim 7, wherein the light conversion layer has an extending portion, the extending portion extends out of the light guide plate from the second side, and the yellow film is disposed at the extending portion.

9. The backlight module as claimed in claim 1, wherein the included angle between the reflecting surface and the light emitting surface is between 45 degrees and 60 degrees.

* * * * *